May 19, 1953  H. SAMMONS  2,638,740
INTERNAL-COMBUSTION TURBINE POWER PLANT
Filed July 3, 1950  7 Sheets-Sheet 1

FIG.1.

Inventor
Herbert Sammons
By Emery Holcombe
+Blair Attorneys.

May 19, 1953 H. SAMMONS 2,638,740
INTERNAL-COMBUSTION TURBINE POWER PLANT
Filed July 3, 1950 7 Sheets-Sheet 2

Inventor
Herbert Sammons

May 19, 1953 H. SAMMONS 2,638,740
INTERNAL-COMBUSTION TURBINE POWER PLANT
Filed July 3, 1950 7 Sheets-Sheet 7

Inventor
Herbert Sammons
By
Emery Holcombe & Blair
Attorneys.

Patented May 19, 1953

2,638,740

UNITED STATES PATENT OFFICE 2,638,740

INTERNAL-COMBUSTION TURBINE
POWER PLANT

Herbert Sammons, Gerrards Cross, England, assignor to D. Napier & Son Limited, London, England, a company of Great Britain Application July 3, 1950, Serial No. 171,942
In Great Britain July 7, 1949

6 Claims. (Cl. 60—39.15)

This invention relates to internal combustion turbine power plants for propulsion purposes of the kind including a jet pipe or nozzle through which the hot products of combustion leaving the turbine are ejected with propulsive effect, and is more particularly concerned with power plants of the pure jet type, that is to say power plants of the kind referred to in which the whole of the propulsive effect is produced by the ejection of hot gases through one or more jet pipes or nozzles, although the invention might in some cases be applied to power plants of the kind in question including a propeller or a ducted fan to provide part of the propulsive effect.

Power plants of the kind referred to employ assemblies each comprising a rotary air compressor the rotor of which is coupled to the rotor of a turbine arranged coaxially with the air compressor rotor and driven by hot gases directed on to it from one or more combustion chambers situated between the compresor and the turbine rotor and in which air delivered to the combustion chamber or chambers by the compressor is burnt with fuel. For convenience the term "compressor section" will be used herein to denote the part of a turbine assembly comprising the air compression rotor and its associated casing and parts while the term "turbine section" will be used to denote the part of the turbine assembly including the turbine rotor, casing and its associated parts. It will be understood that the compressor section and/or the turbine section may be of the single or multiple stage type.

An object of the invention is to provide a compact and convenient form of internal combustion turbine power plant which will lend itself to the obtaining of a high power or thrust output with comparatively small bulk and more particularly with a comparatively small overall cross-sectional area, while having generally the characteristics required of a high speed propulsion unit for aircraft intended to travel at speeds approaching or exceeding the speed of sound.

An internal combustion turbine power plant for propulsion purposes according to the present invention comprises three internal combustion turbine assemblies each of the kind referred to arranged with their axes lying on the apices of a triangle and comprising a unit.

Preferably the unit has a common jet pipe or nozzle through which the gases from the three turbines are ejected into the atmosphere with propulsive effect although in some cases separate nozzles may be provided for the gases from the three turbines, or a nozzle divided into separate sections respectively for the gases from the turbines by suitable partitions may be used. For convenience in the present specification the term "jet or nozzle" will be used and is to be understood as including two or more jets or nozzles where applicable as well as a single jet or nozzle.

In one arrangement each of the three internal combustion turbine assemblies has a separate annular combustion chamber or series of combustion chambers extending between its compressor section and its turbine section, while in other cases the three assemblies might have a common combustion chamber or a common series of combustion chambers into which the three compressor sections deliver air and from which the hot gases pass to the three turbine sections.

In any case the gases leaving the turbine sections may be led through diffusers into one or more further combustion chambers, hereinafter termed "after-burning" chambers, communicating with the jet or nozzle, in which case means are provided for delivering additional fuel into such gases so that unburnt air therein can be burnt in the after-burning combustion chamber or chambers to increase the propulsive effect of the jet of gases ejected from the nozzle.

The arrangement is preferably such that either the three internal combustion turbine assemblies may be maintained in operation at once or when desired only two of such assemblies may be maintained operative while the other is idle, or, in some cases, such that when desired only one assembly may be operative while the other two are idle. In any case means are preferably provided by which the effective cross-sectional area of the nozzle can be varied to suit different conditions of flight and/or operation, as for example to suit the number of assemblies in operation.

At least one of the internal combustion turbine assemblies includes a drive by which auxiliary apparatus such as fuel pumps, a cabin supercharger, hydraulic pumps, electric generators or the like, can be driven, and the arrangement of the drive is preferably such that power can be transmitted to it from at least two of the assemblies with a free-wheel or like device between each of the assemblies and the drive for the auxiliary apparatus so that the auxiliary apparatus can be driven by whichever of the assemblies is in operation at any moment, thus avoiding the necessity for duplicating the auxiliary apparatus to allow for one or more of the assemblies being inoperative. It will be understood, nevertheless, that each assembly may be provided with an individual drive or drives for part or all of the auxiliary apparatus associated with it such for example as its fuel pump, whether a common auxiliary drive as described above is also provided or not.

It will readily be understood that the triangle at the apices of which the axes of the three assemblies lie, will normally be of the isosceles type and, while it may be an equilateral triangle, it is preferably an isosceles triangle the base of which is longer than either of the two sides, such an arrangement not only providing a space between the two lower assemblies in which an auxiliary drive can be arranged but also providing a form which is particularly well suited to an aircraft of the low wing monoplane type since the general cross-section of the power plant provides for a comparatively wide base where it is supported on the main wing.

The arrangement of the air intake or air intakes for the power plant may vary considerably. For example, in one case a separate air intake may be provided for each of the turbine assemblies. In a preferred arrangement, however, the air intake for the turbine assemblies comprises two laterally displaced air passages communicating at their rear ends with and merging into the air inlets of the compressor sections of the three assemblies, and at their front ends communicating either with separate air intake orifices or with a common air intake orifice. In such an arrangement a pilot's cockpit and/or the auxiliary mechanism associated with the power plant may be situated in the space between the two air passages. For example, the pilot's cockpit with the necessary instruments may be situated in the forward part of the space in question while a gear box and its associated parts carrying and driving auxiliary apparatus and connected by a suitable drive to one or more of the turbine assemblies may be situated in the rear part of this space as above described.

In such an arrangement each of the two air passages may be divided towards its rear end into upper and lower parts by a partition, each upper part having a cross-sectional area of approximately one-half that of its associated lower part and the two upper parts may lead to the air inlet of the compressor section of the upper turbine assembly while the two lower parts lead respectively to the air inlets of the compressor sections of the two lower turbine assemblies.

The invention may be carried into practice in various ways but one construction according to the invention is illustrated by way of example and in part somewhat diagrammatically in the accompanying drawings, in which Figure 2 is a plan view of the aircraft shown in Figure 1, Figure 3 is a front elevation of the aircraft shown in Figures 1 and 2, Figures 4 and 5 are cross sections through the aircraft shown in Figures 1, 2 and 3 taken respectively on the lines 4—4 and 5—5 of Figure 2, Figures 6A and 6B are sectional side elevations on a much enlarged scale, taken along the lines 6—6 of Figure 7, Figure 6A showing the construction of the front end of the upper turbine assembly or unit, and Figure 6B showing the mechanism for driving the fuel pumps and auxiliary apparatus.

Figure 11 is a rear elevation of the jet nozzle.

In the construction illustrated the power plant as a whole is housed within a streamlined shell A, which constitutes the fuselage of an aircraft having main wings $A^1$, a tail fin $A^2$ and a tail plane $A^3$ supported thereon, with the usual control surfaces.

The power plant comprises three internal combustion turbine assemblies indicated generally at B, C and D arranged with their axes on the apices of an isosceles triangle having a base somewhat longer than each of its sides.

Each of the turbine assemblies comprises an air compressor section of the axial flow type having one or more stages and generally indicated at $B^1$, $C^1$, $D^1$ and a turbine section $B^2$, $C^2$, $D^2$, connected to its associated compressor section by a combustion chamber or series of combustion chambers $B^3$, $C^3$, $D^3$, provided with means for the injection of fuel in known manner.

Figure 1:
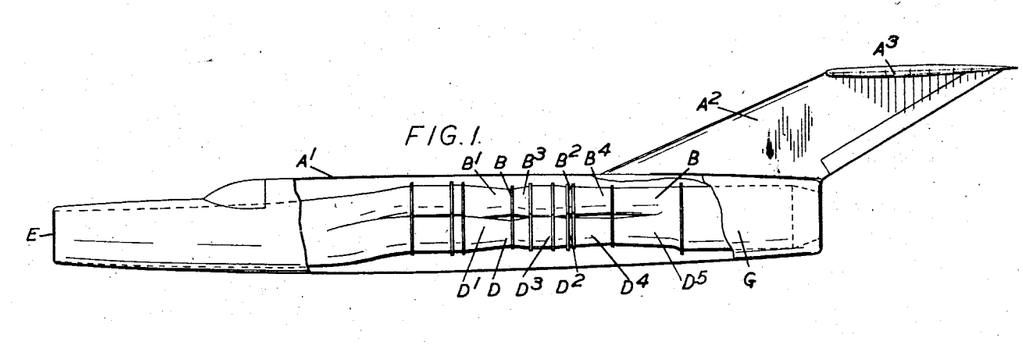
Figure 1 is a diagrammatic side elevation of a complete aircraft incorporating a power plant according to the invention.
Figures 2, 3, 4, 5, 11:
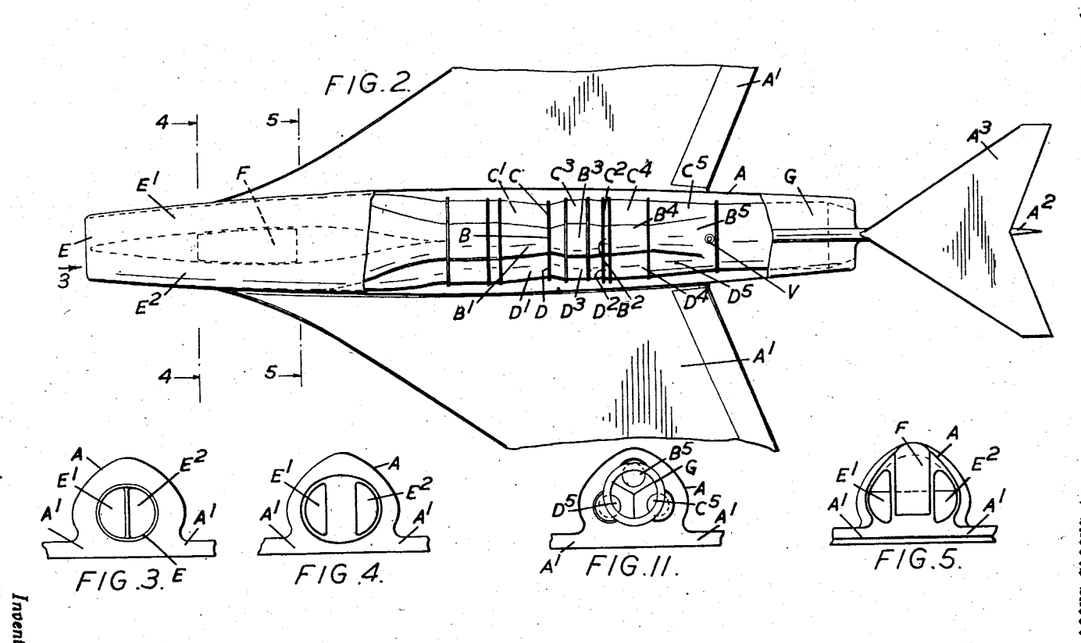

The air inlets of the three compressor sections $B^1$, $C^1$, $D^1$ communicate with the rear end of an air intake system comprising an approximately circular air intake orifice E at the extreme forward end of the fuselage A, the air intake passage immediately behind this orifice being divided into two branches $E^1$, $E^2$ which are spaced laterally from one another, as shown best in Figure 2, and pass along opposite sides of the fuselage to a point slightly in advance of the inlets to the compressor sections where each branch passage $E^1$, $E^2$ is provided with a partition dividing it into upper and lower parts, the upper part having a cross sectional area of approximately half that of the lower part. The two upper parts are brought together to form a single inlet passage communicating with the inlet to the compressor section $B^1$ while the two lower parts communicate respectively with the inlets to the compressor sections $C^1$ and $D^1$.

As will be seen, the outer walls of the two passages $E^1$ and $E^2$ lie close to the fuselage while their inner walls are spaced apart and are substantially vertical and flat. There is thus left between the inner walls of the two passages $E^1$ and $E^2$ a space in which is arranged a cockpit for the pilot of the aircraft as indicated at F.

The outlets from the turbine sections $B^2$, $C^2$, $D^2$ lead into diffusers $B^4$, $C^4$, $D^4$ from which the gases flow through chambers or passages $B^5$, $C^5$, $D^5$ into a common propulsion nozzle G. This nozzle may include means of known type for varying its effective cross sectional area but since such means are well known and do not in themselves form any part of the present invention they are not illustrated.

The general form of the turbine assemblies will be of known type and in itself forms no part of the present invention and will not therefore be described in detail. The forward end of one of the compressor sections is, however, illustrated in Figure 6 which shows the forward end of the bladed rotor H supported in bearings indicated at $H^1$ from the casing $H^2$ by means of hollow radial arms $H^3$ extending across the air inlet. Each of the other compressor sections is similarly constructed.

Figure 7:
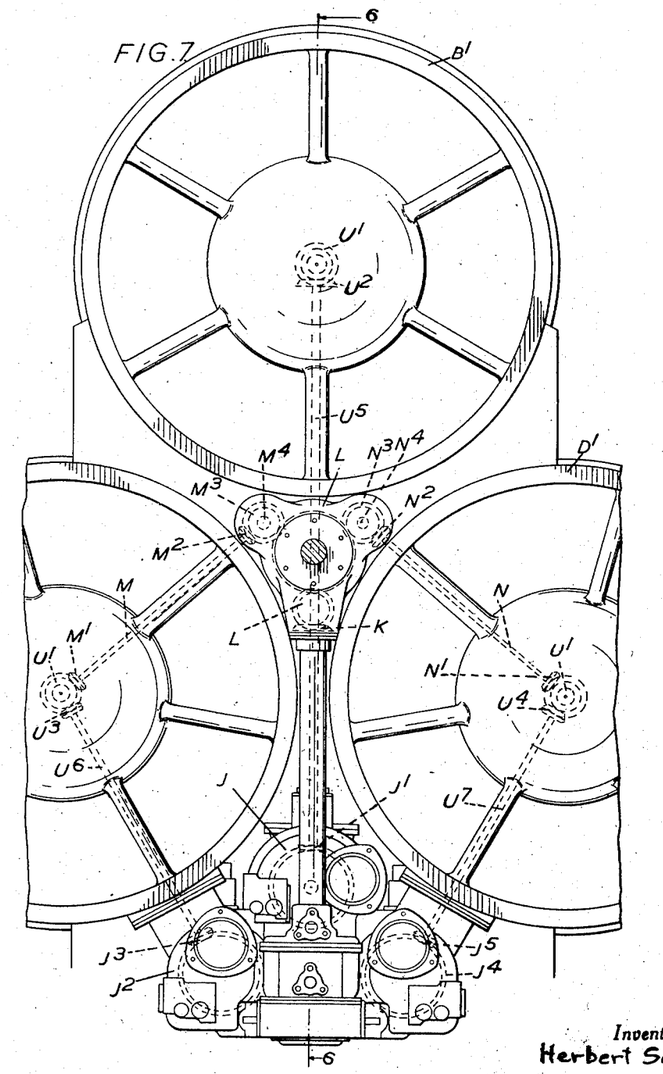
Figure 7 is a front elevation of the complete power plant without the air intakes on the same scale as Figure 6.

The driving mechanism for the fuel pumps and lubricating pump and other auxiliary apparatus is shown more especially in Figures 6, 7, 8, 9 and 10 and is constructed as follows:

The forward end of each compressor rotor is connected to a shaft U carrying a bevel wheel $U^1$. The three bevel wheels $U^1$ mesh respectively with co-operating bevel wheels $U^2$, $U^3$, $U^4$ on the adjacent ends of three shafts $U^5$, $U^6$, $U^7$ as shown in Figure 7. The shaft $U^5$ drives a fuel pump J for feeding the combustion chamber $B^3$ by means of bevel gearing $J^1$, and shaft $U^6$ drives a fuel pump $J^2$ for feeding the combustion chamber $C^3$ by means of bevel gearing $J^3$ and the shaft $U^7$ drives a fuel pump $J^4$ for feeding the combustion chamber $D^3$ by means of bevel gearing $J^5$.

The shaft $U^5$ in addition to driving the bevel wheel $U^1$ on its lower end, also drives an intermediate bevel wheel K meshing with a bevel wheel $K^1$ on a shaft $K^2$ carried in bearings in a housing L. The bevel wheels $U^1$ of the units $C^1$ and $D^1$ also respectively drive shafts M and N through bevel wheels $M^1$, $N^1$, the shafts M and N carrying at their upper ends bevel wheels $M^2$, $N^2$ meshing with bevel wheels $M^3$, $N^3$ on shafts $M^4$, $N^4$ similar to the shaft $K^2$ and supported in the housing L in a similar manner to the shaft $K^2$ and disposed as shown in Figure 7.

Figure 6A:
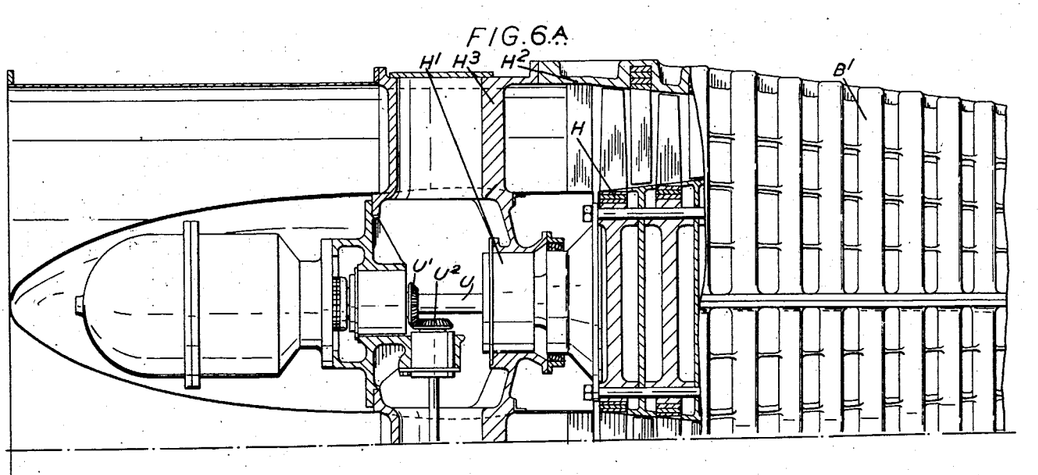
Figure 6B:
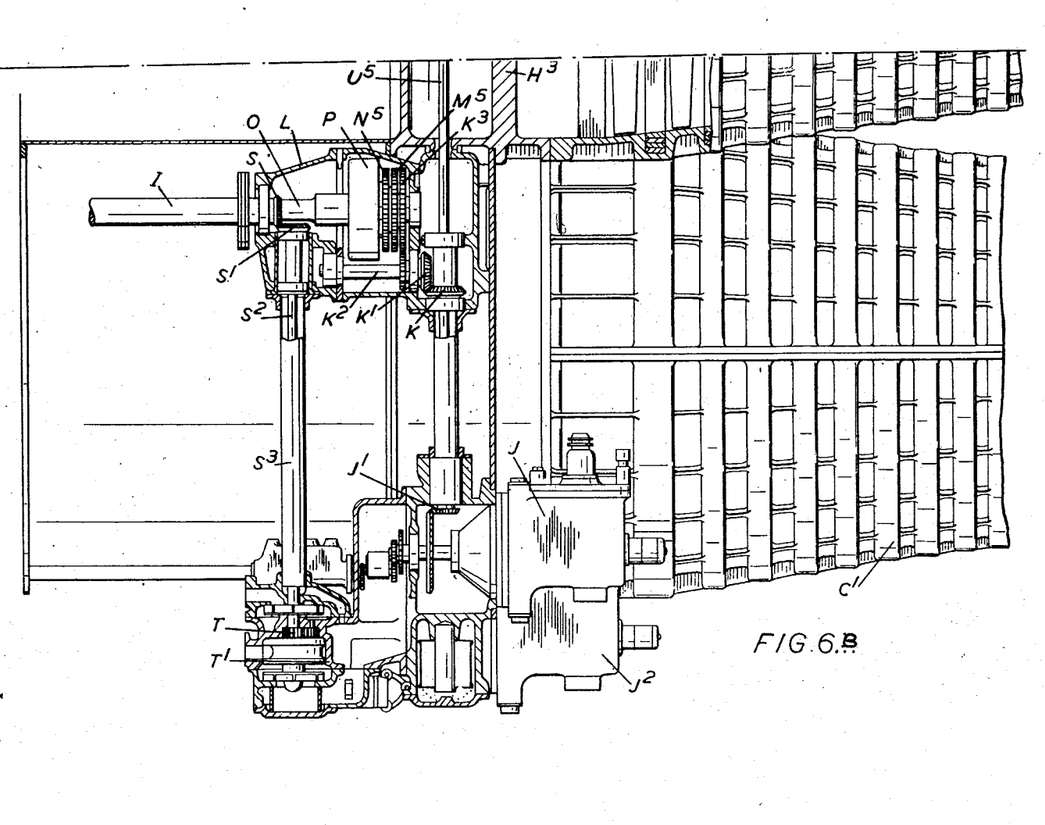

The shafts $K^2$, $M^4$ and $N^4$ are arranged to transmit rotation to a driven or output shaft O through differential gearing within the housing L and indicated generally in Figure 6 by the reference letter P. The differential gearing, which is shown most clearly in Figure 8, comprises three coaxial driving or input gears $K^3$, $M^5$, $N^5$ meshing respectively with gear wheels on the three shafts $K^2$, $M^4$, $N^4$, one of these gear wheels, $K^4$, only appearing in Figure 8. The gear wheels $K^3$, $M^5$, $N^5$ are mounted respectively on three concentric tubular shafts or hubs $K^5$, $M^6$, $N^6$, the shaft $K^5$ carrying at its end a sun wheel $K^6$, the shaft $M^6$ being formed at its end as a spider $M^7$ carrying planet wheels $M^8$ while the shaft $N^6$ carries at its end a sun wheel $N^7$ lying within but not meshing with the planet wheels $M^8$.

Figure 8:
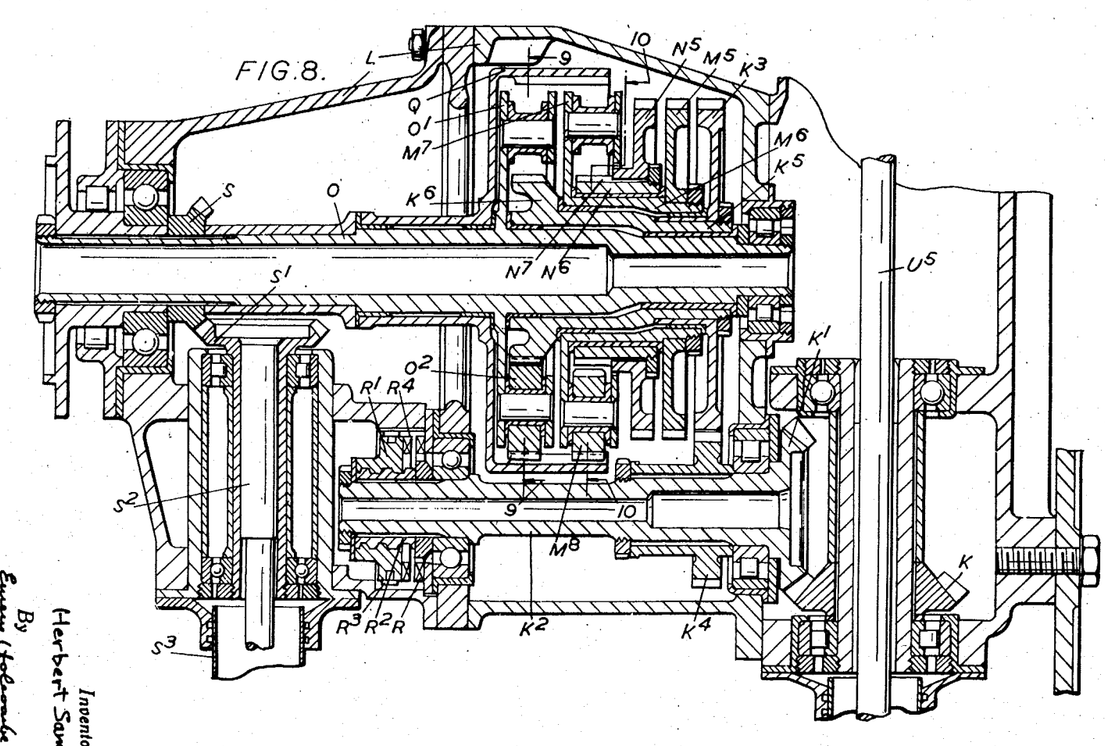
Figure 8 is a sectional side elevation on a still further enlarged scale showing part of the driving mechanism for auxiliary apparatus.
Figure 9:
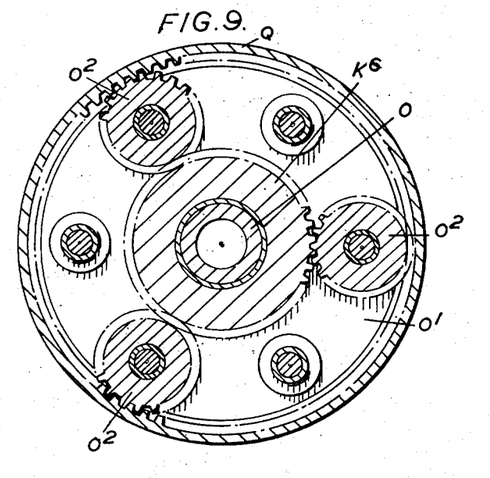
Figures 9 and 10 are cross sections on the lines 9—9 and 10—10 respectively on Figure 8.
Figure 10:
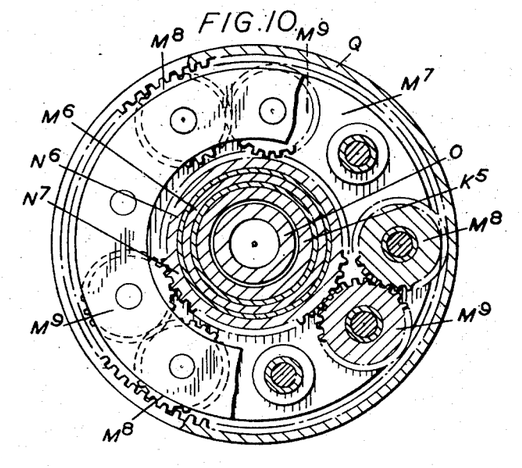

The driven or output shaft O has rigidly connected to it a spider $O^1$ carrying planet wheels $O^2$ which mesh with the sun wheel $K^6$ and also with the internal teeth of an internally toothed ring Q, which is freely supported on bearings on the shaft O and the teeth of which are also engaged by the planet wheels $M^8$.

The spider $M^7$, in addition to carrying the planet wheels $M^8$ which mesh with the internally toothed ring Q, carries planet wheels $M^9$ each of which meshes with one of the planet wheels $M^8$ and also with the sun wheel $N^7$.

Each of the shafts $K^2$, $M^4$ and $N^4$ has associated with the end thereof remote from its bevel wheel a unidirectional braking device which permits it to rotate freely in the direction in which it is driven, but prevents its reverse rotation. Each of such devices, one of which is shown in Figure 8, comprises a dog clutch device having a fixed toothed part R and an axially movable toothed part $R^1$, the part $R^1$ being mounted upon a quick pitch screwthread $R^2$ upon the shaft $K^2$, $M^4$ or $N^4$ and carrying frictional pads or the like $R^3$ which engage a friction surface $R^4$ surrounding the device. Thus, when the shaft $K^2$, $M^4$ or $N^4$ is rotating in the forward direction the member $R^1$ is automatically moved and maintained by the quick-pitch screwthread so that the teeth thereon are out of engagement with the teeth on the part R, but if and when rotation of the shaft begins in the reverse direction, the frictional drag of the friction pads $R^3$ will check rotation of the part $R^1$ and thus cause the quick-pitch screwthread to move the member $R^1$ so that the teeth thereon engage the teeth on the part R, so as positively to prevent reverse rotation of the shaft.

With the mechanism so far described it will be seen that the driven or output shaft O will be driven through the differential mechanism from any one or more of the shafts $U^5$, N or M which at the moment is being driven by its associated turbine unit and a speed corresponding to the sum of the speeds of rotation of the shafts $U^5$, M and N, reverse rotation of any one or more of the shafts $K^2$, $M^4$ or $N^4$, which at the moment is not being driven, being automatically prevented by the unidirectional braking device R, $R^1$, $R^2$, $R^3$, $R^4$.

The shaft O carries the bevel wheel S meshing with the bevel wheel $S^1$ by which a vertical shaft $S^2$ is driven, the vertical shaft $S^2$ passing downwards through a tubular housing $S^3$ and serving to drive a lubricating oil pump T arranged within the housing $T^1$ to which in known manner lubricating oil from the appropriate parts of the whole unit drains.

It will thus be seen that the lubricating pump T will be driven at a speed in accordance with the sum of the speeds of rotation of the three turbine units constituting the complete power plant. The arrangement and gear ratios employed are such that if only one turbine unit is in use the quantity and pressure of the lubricant supplied will be adequate and yet when all three units are in use the quantity of lubricant supplied will, while possibly being surplus to the minimum requirements, not exceed what can reasonably be dealt with.

The shaft O may as shown be arranged for connection to a shaft I by which other auxiliary apparatus may be driven, for example a cabin supercharger, one or more hydraulic pumps or the like.

Further in some cases means may be provided for injecting additional fuel through one or more nozzles as indicated at V into the chamber immediately in advance of the nozzle G which thus constitutes an after-burning chamber in which surplus air in the gases leaving the turbine assemblies can be burnt to increase the propulsive effect.

What I claim as my invention and desire to secure by Letters Patent is:

1. An internal combustion turbine power plant for propulsion purposes comprising three internal combustion turbine assemblies constituting a self-contained power unit, each assembly comprising coaxial compressor and turbine rotors rotatably connected to one another and at least one combustion chamber extending between and forming a fluid conducting connection between said rotors, the axes of said three assemblies lying at the apices of a triangle with its base horizontal, including auxiliary apparatus and means for driving the same from said assemblies including a common driven shaft and transmission mechanism connecting it to each assembly whereby said driven shaft will be driven by the one or more of the assemblies in operation.

2. An internal combustion turbine power plant as claimed in claim 1, in which the mechanism for driving the auxiliary apparatus comprises differential gearing having an output shaft connected to the auxiliary apparatus, three input shafts connected respectively to the rotors of the three turbine assemblies, and a unidirectional braking device for preventing reverse rotation of each input shaft.

3. An internal combustion turbine power plant as claimed in claim 2, in which the auxiliary apparatus connected to the driven shaft includes a lubricating oil circulating pump supplying oil to all three assemblies.

4. An internal combustion turbine power plant for propulsion purposes comprising three internal combustion turbine assemblies each including a rotary air compressor and a turbine with the rotors of the compressor and turbine connected to one another to constitute a rotor assembly and at least one combustion chamber extending between the compressor and turbine to provide three internal combustion turbine assemblies each of which has its own individual turbine, compressor, and combustion chamber or chambers and is operable independently of the other two internal combustion turbine assemblies, the axes of the three turbine assemblies lying at the apices of a triangle, and driving mechanism for auxiliary apparatus required for the function of the power unit comprising three rotary driving members connected respectively to the three rotor assemblies and a single driven member arranged to be driven by one or more of the driving members irrespective of whether one or more than one of the internal combustion turbine assemblies is in operation.

5. An internal combustion turbine power plant as claimed in claim 4 in which the driving mechanism for auxiliary apparatus comprises differential mechanism having three input members connected respectively to the three driving members, an output member connected to the driven member which is thereby driven in accordance with the sum of the rotations of the three driving members, and automatic braking means for preventing reverse rotation of each of the three input members.

6. An internal combustion power plant as claimed in claim 5 in which auxiliary apparatus connected to the driven member includes a lubricating oil circulating pump supplying oil to all three internal combustion turbine assemblies.

HERBERT SAMMONS.

References Cited in the file of this patent

UNITED STATES PATENTS

| Number | Name | Date |
|---|---|---|
| 1,660,439 | Greve | Feb. 28, 1928 |
| 1,677,026 | Buckland et al. | July 10, 1928 |
| 2,073,191 | Belluzzo | Mar. 9, 1937 |
| 2,186,999 | Stone et al. | Jan. 16, 1940 |
| 2,520,434 | Robson | Aug. 29, 1950 |

FOREIGN PATENTS

| Number | Country | Date |
|---|---|---|
| 290,222 | Great Britain | Nov. 15, 1928 |
| 593,403 | Great Britain | Oct. 16, 1947 |
| 564,300 | Germany | Nov. 17, 1932 |
| 333,081 | Italy | Dec. 19, 1935 |

OTHER REFERENCES

"Flight," Issue of July 29, 1948, pp. 126, 127.